Patented Dec. 6, 1932

1,890,060

UNITED STATES PATENT OFFICE

WALTER E. LAWSON, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF POLYMERIZING VINYL DERIVATIVES

No Drawing.  Application filed September 22, 1928.  Serial No. 307,773.

This invention relates to the art of polymerization, and more particularly to the polymerization of vinyl derivatives.

I have found that ozone is an excellent catalyst for the polymerization of a wide range of vinyl derivatives.

It is therefore an object of this invention to provide a method of polymerizing vinyl derivatives.

With the above and other objects in view, which will be apparent as the description proceeds, I have set forth my invention in the following specification and have included the following examples by way of illustration and not as a limitation.

In each of the examples given below, the solvent was subjected to the passage of an ozone-air mixture for 2 hours previous to the addition of the vinyl compound, and the ozonized solutions were used within 24 hours of their preparation because my experiments have indicated that their catalytic efficiency is markedly decreased if they are allowed to stand for a longer period before use.

Example 1

A solution of 25 grams vinyl acetate in 44 grams absolute methanol, which had been previously treated with ozone as described above, was heated in a sealed tube at 90° C. for 5 hours. Twelve grams of resin was secured, equivalent to a polymerization of 48%.

Example 2

A solution of 17 grams vinyl chloride in 69 grams ozonized methanol was heated in a sealed tube for 5 hours at 120° C. Seven grams of resin was secured, which consisted entirely of the acetone soluble or alpha polymer. This was equivalent to a yield of 41%, which is an unusually high percentage of polymerization as compared with other catalysts. I have found that the partial pressure of the vinyl chloride in the solution has an important influence on the yield of polymer.

Example 3

A solution of 25 grams vinyl chloracetate in 42 grams methanol, which had been previously treated with ozone, was heated in a sealed tube for 5 hours at 90° C. Polymerization amounted to 18 grams equivalent to a yield of 72%.

Example 4

A solution of 25 grams vinyl benzene (styrene) in 56 grams ozonized methanol was heated in a sealed tube for 5 hours at 90° C. Twenty grams of polymer was obtained, equivalent to a yield of 75%.

Example 5

Thirty grams of 45% solution of vinyl benzene (styrene) in ethyl benzene was added to 10 grams of butyl alcohol which had been treated with ozone. The solution was heated at atmospheric pressure for two hours at 90° to 100° C. A yield of 52% meta styrene was secured, even with this small amount of ozone solution.

Example 6

A 60 gram sample of 45% vinyl benzene (styrene) in ethyl benzene was treated with ozone for 15 minutes. Ten grams of this product was added to 20 grams of untreated 45% styrene and the mixture heated for 3 hours in a bath maintained at 90°–100° C. Polymerization amounted to 30%. A control sample, no part of which had been subjected to treatment with ozone, gave 18% of polymer under similar conditions of time and temperature.

Example 7

Vinyl chloride was added to ozonized ethylene dichloride until a 26% solution by weight was obtained. A sealed tube three-quarters full of this solution (96 grams) was heated in a bomb oven for 5 hours at 90° C., yielding 6% of acetone-soluble polymer.

Example 8

A solution of 77 grams vinyl chloride in 308 grams ozonized methanol was exposed outdoors in a low expansion glass flask for three days, one of which was clear, one fair, and one rainy. A yield of 37 grams of mixed alpha and beta polymers was secured, equivalent to 48%. Six experiments of outdoor exposures with uranyl nitrate gave an average yield of 39%.

Example 9

A solution of 173 grams of methanol containing 10% water was treated with ozone as previously described. To this solution was added 45.5 grams of vinyl chloride. An aliquot portion was heated in a sealed tube for 5 hours at 90° C. Polymerization amounted to 44.7%, all of which was the alpha polymer.

Example 10

Another portion of the vinyl chloride solution in 90% methanol, 10% water, described in Example 9, was exposed outdoors to daylight for 2½ days, one day of which was clear, one day fair, and one-half day cloudy. A yield of 38% of mixed alpha and beta polymer was secured.

Although the above examples are limited to the polymerization of vinyl acetate, vinyl chloride, vinyl chloracetate and vinyl benzene, my process is also applicable to the polymerization of other vinyl derivatives.

As indicated by Examples 1–8 I may use anhydrous solvents but, as indicated by Examples 9 and 10, the use of such solvents is not necessary. The best solvents have been found to be esters and alcohols.

From the above description and examples it will be apparent that ozone is an effective catalyst for a wide range of vinyl derivatives, and that it is efficient for polymerization by either heat or light. This is in marked contrast with other catalysts, many of which, such as benzoyl peroxide, are effective only in the presence of heat, while others, such as uranyl nitrate, are effective only in the presence of light, while still other catalysts are effective for the polymerization of only certain vinyl derivatives. For example, among the inorganic peroxides, I have found that only barium and lead peroxides are catalysts for the polymerization of vinyl acetate, and only barium peroxide is effective for the polymerization of vinyl chloride. On the other hand, sodium, calcium, strontium, and magnesium peroxides do not catalyze the polymerization of either vinyl chloride or vinyl acetate.

Although the above examples are limited to the use of ozone in batch processes, my invention is not limited thereto, as it is also highly advantageous in continuous flow systems, such as that disclosed and claimed in my copending application 307,774 filed of even date herewith. In such systems the solvents can, if desired, be continuously charged with ozone in a manner somewhat similar to that used in the purification of water.

As many apparently widely different embodiments of this invention may be made without departing from the spirit and scope thereof, it is to be understood that I do not limit myself to the specific embodiments thereof except as defined in the appended claims.

I claim:

1. The method of polymerizing vinyl esters which comprises catalyzing them with ozone.

2. The method of polymerizing vinyl chloride which comprises catalyzing it with ozone.

3. The method of polymerizing vinyl esters which comprises heating them in the presence of ozone.

4. The method of polymerizing vinyl chloride which comprises heating it in the presence of ozone.

5. The method of polymerizing vinyl chloride which comprises heating a solution of vinyl chloride in ozonized methanol.

6. The method of claim 5 in which 17 parts by weight of vinyl chloride are dissolved in 69 parts by weight of ozonized methanol.

7. The method of claim 5 in which the heating is effected at from 90 to 120° C.

8. The method of polymerizing one of the group of compounds consisting of vinyl esters and styrene which comprises catalyzing them with ozone.

9. The method of polymerizing one of a group of compounds consisting of vinyl esters and styrene which comprises dissolving ozone in a solvent for the compound and dissolving the compound in the ozonized solvent.

10. The method of polymerizing one of a group of compounds consisting of vinyl esters and styrene which comprises dissolving ozone in a solvent for the compound, dissolving the compound in the ozonized solvent, and heating.

In testimony whereof, I affix my signature.

WALTER E. LAWSON.